(12) United States Patent
Marchetti

(10) Patent No.: US 9,090,208 B2
(45) Date of Patent: Jul. 28, 2015

(54) END CAP DOOR ASSEMBLY

(71) Applicant: Ford Global Technologies, LLC, Dearborn, MI (US)

(72) Inventor: Bernard Gerard Marchetti, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 13/910,641

(22) Filed: Jun. 5, 2013

(65) Prior Publication Data

US 2014/0361568 A1   Dec. 11, 2014

(51) Int. Cl.
*B60R 13/00* (2006.01)
*B60R 7/04* (2006.01)
*B60K 37/00* (2006.01)
*B60R 13/02* (2006.01)
*B60R 7/06* (2006.01)

(52) U.S. Cl.
CPC . *B60R 7/04* (2013.01); *B60K 37/00* (2013.01); *B60R 7/06* (2013.01); *B60R 13/0256* (2013.01); *B60R 2013/0287* (2013.01)

(58) Field of Classification Search
CPC .................. B60R 7/06; B60R 13/0256; B60R 2013/0287
USPC .................................. 296/37.8, 37.12, 37.13
See application file for complete search history.

(56) References Cited

U.S. PATENT DOCUMENTS

| 4,239,277 | A | 12/1980 | Oda |
| 4,700,848 | A | 10/1987 | Fujiki et al. |
| 4,807,920 | A | 2/1989 | Fujiki et al. |
| 7,780,212 | B2 | 8/2010 | Hirata et al. |
| 8,511,733 | B2 * | 8/2013 | Blackmore et al. ........ 296/37.12 |
| 2007/0241582 | A1 * | 10/2007 | McKeever ................. 296/37.12 |

FOREIGN PATENT DOCUMENTS

JP   2008-296651   12/2008

OTHER PUBLICATIONS

Skoda Superb's Umbrella Holder for Monsoon, Jun. 28, 2012, 2 pages.

* cited by examiner

*Primary Examiner* — Joseph D Pape
(74) *Attorney, Agent, or Firm* — Vichit Chea; Price Heneveld LLP

(57) ABSTRACT

A cover assembly for a panel end cap includes a housing having an aperture, wherein the aperture opens into a storage compartment which laterally extends into an instrument panel of a vehicle. A cover is pivotally coupled to the housing for covering the housing aperture in a closed position and allowing access to the storage compartment in an open position. A biasing mechanism is coupled to the housing and the cover to bias the cover to the closed position.

18 Claims, 13 Drawing Sheets

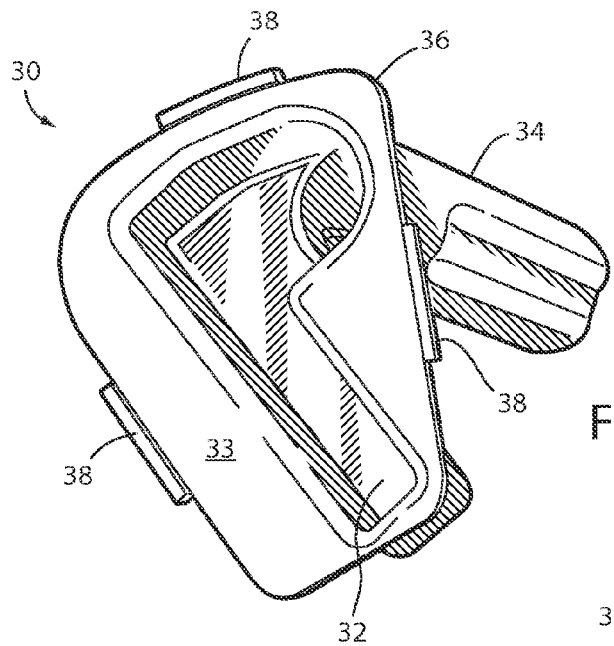
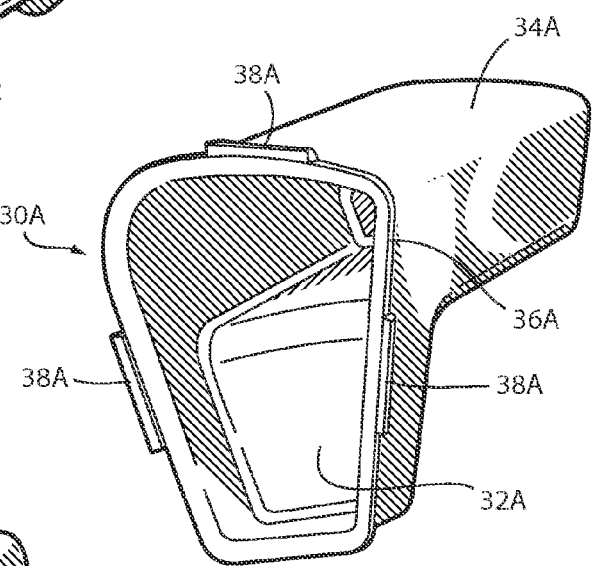
Fig. 5A
Fig. 5B
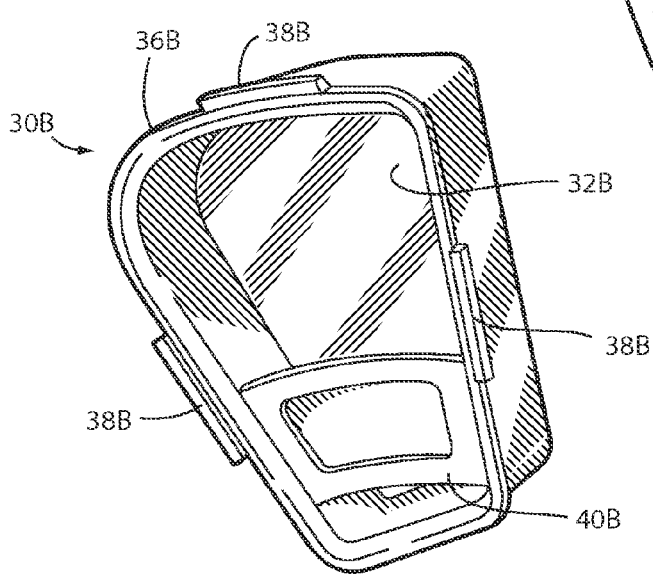
Fig. 5C

END CAP DOOR ASSEMBLY

FIELD OF THE INVENTION

The present invention generally relates to a cover or door for a panel end cap disposed on an instrument panel in a motor vehicle, and, more specifically, to a cover or door for a panel end cap, wherein the door is adapted to pivot at relative to a housing between open and closed positions to allow access to a housing aperture which opens into a panel end cap storage compartment laterally extending into the instrument panel.

BACKGROUND OF THE INVENTION

A feature found in current automotive designs includes a storage area disposed in a panel end cap. Generally, when a vehicle door adjacent to the panel end cap is in an open position, the panel end cap storage compartment is accessible. Storage compartments, as found in a panel end cap, are open compartments for which vehicle occupants can access items stored therein. However, having open storage compartments is unsightly, and items may shift during transport and fall out of the storage areas when the vehicle door is in an open position. Thus, a door or cover is desired to retain items in the storage area and to provide an aesthetically pleasing appearance to the panel end cap when an adjacent vehicle door is in an open position. Further, the space constraints at a panel end cap are limited, such that a door or cover that is hinged or slides using known technology is impractical as the door cannot protrude any further than the existing end cap. Further, the door or cover must automatically close once it is released by a vehicle occupant, such that the vehicle door does not break the panel end cap cover as the vehicle door is closed.

The present invention provides a pivoting door which rotates in a car-rearward and downward direction and is spring loaded to automatically revert back to the closed position when released by a vehicle occupant. The present invention provides a closure for the end cap of an instrument panel that can fit in the tight spacing confines allotted between a vehicle instrument panel and an adjacent vehicle door assembly.

SUMMARY OF THE INVENTION

One aspect of the present invention includes a cover assembly for a panel end cap which includes a housing having an aperture, wherein the aperture opens into a storage compartment. The storage compartment laterally extends into a vehicle instrument panel. A cover is pivotally coupled to the housing for covering the housing aperture in a closed position and allowing access to the storage compartment in an open position. A biasing member is coupled to the housing and the cover to bias the cover to the closed position.

Another aspect of the present invention includes a cover assembly for a panel end cap including a housing having first and second slots and aperture which opens into a laterally extending storage compartment disposed in an instrument panel. A cover having guide members operably coupled to the first and second slots of the housing is slidably supported between open and closed positions relative to the housing. The cover is accessible only when a vehicle door adjacent to the panel end cap is in an open position.

Yet another aspect of the present invention includes a cover assembly of a panel end cap which includes a housing coupled to a panel end cap storage compartment. A cover is pivotally coupled to the housing between open and closed positions. The panel end cap storage compartment extends laterally into a vehicle dashboard or instrument panel along a first axis. The cover pivots relative to the housing along a rotational axis to define a plane that is substantially perpendicular to the first axis.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIGS. 5A-5C are perspective views of various panel end cap storage compartments as used with the present invention;

DETAILED DESCRIPTION OF THE PREFERRED EMBODIMENTS

Figure 1:
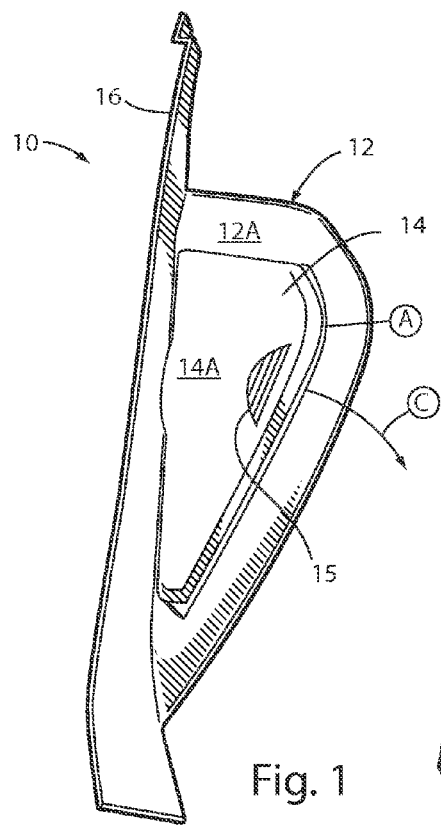
FIG. 1 is a side elevational view of a left-hand panel end cap cover assembly according to one embodiment of the present invention, showing a cover member in a closed position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. It is noted that the present invention includes a panel end cap assembly which is adapted to be coupled to an instrument panel at either the left-hand or right-hand ends of the instrument panel. The left-hand and right-hand panel end cap cover assemblies will function in a similar manner having nearly identical componentry, however, the assemblies be mirror images of each other as disposed on opposing ends of the vehicle instrument panel. Further, as noted throughout this disclosure, the term "vehicle door" will be used to identify a passenger door on a vehicle as opposed to the end cap door assembly being specifically disclosed.

Figure 2:
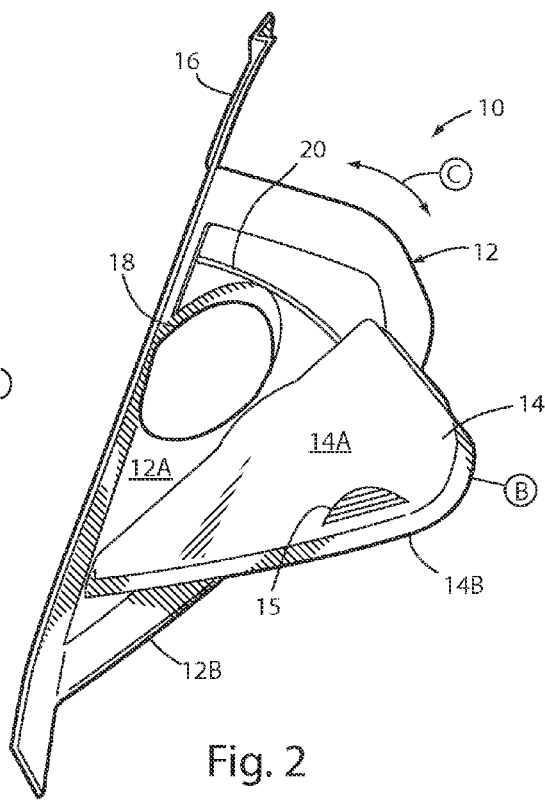
FIG. 2 is a side elevational view of the panel end cap cover assembly of FIG. 1, showing the cover member in an open position.

Referring now to FIGS. 1 and 2, the reference numeral 10 generally designates a panel end cap assembly for use on a left-hand end of an instrument panel or vehicle dashboard. As used throughout this disclosure, reference numeral 10 will indicate a left-hand panel end cap cover assembly and reference numeral 10A will represent a right-hand panel end cap cover assembly. As shown in FIG. 1, the panel end cap cover assembly 10 includes a housing 12 and a door or cover member 14 shown in a closed position A in FIG. 1. The door or cover 14 is pivotally coupled to the housing 12 such that the door is adapted to articulate between the closed position A (FIG. 1) and an open position B, as shown in FIG. 2, along an articulation path or rotational axis as indicated by arrow C. As shown in FIG. 2, the cover 14 has been pivotally moved along a path as indicated by arrow C to the open position B. The housing 12 includes a base panel portion 16 which is adapted to couple to an instrument panel disposed within a vehicle interior. The housing 12, as shown in FIG. 2, further includes an aperture 18 which, in assembly, is adapted to align with and open into a panel end cap storage compartment that laterally extends into an instrument panel as further described below. In the embodiment shown in FIG. 2, the housing 12 includes an exterior facing side 12A and an interior facing side 12B having through slot 20 which is used to couple and guide the door member 14 between the open position B and the closed position A as further described below. The cover member 14 also includes exterior facing side 14A and an interior facing side 14B with a handle portion 15 disposed on the exterior facing side 14A that is configured to be engaged by a vehicle occupant for opening and closing the cover member 14.

Figure 3:
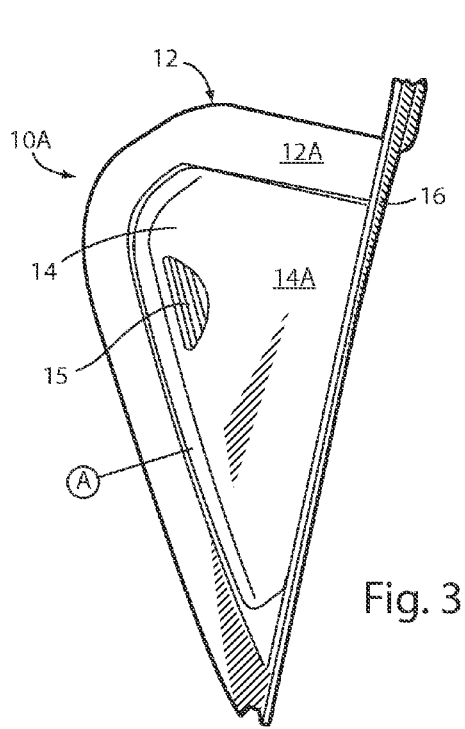
FIG. 3 is a side elevational view of a right-hand panel end cap cover assembly, showing a cover member in a closed position.
Figure 4:
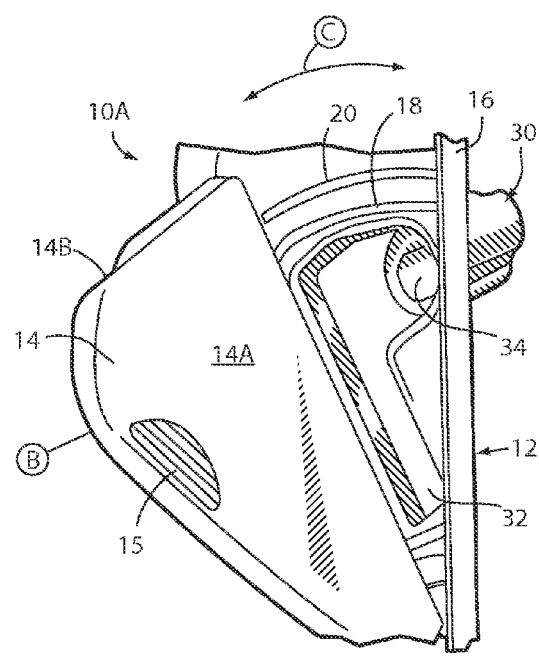
FIG. 4 is a perspective view of the panel end cap cover assembly of FIG. 3, showing the cover member in an open position.

Referring now to FIGS. 3 and 4, a right-hand panel end cap cover assembly 10A is shown having similar componentry as described above with reference to FIGS. 1 and 2. With specific reference to FIG. 3, the cover member 14 of the panel end cap cover assembly 10A is shown in a closed position A. With specific reference to FIG. 4, the cover member 14 is shown in an open position B, thereby revealing a housing aperture 18 which opens into a panel end cap storage compartment 30. In the embodiment shown in FIG. 4, the panel end cap storage compartment 30 includes a slotted storage area 32 and a laterally extending storage compartment 34 which, as noted above, is adapted to laterally extend into an instrument panel from the housing. The panel end cap storage compartment 30, as shown in FIG. 4, is one of several embodiments that are adapted for use with the present invention. The specific configuration of the storage compartment 30, having a slotted portion 32 and a laterally extending portion 34, is configured in this way to accommodate the various wiring, duct work, electronics, and other storage compartments that are already present in the limited space of a vehicle instrument panel. Other storage compartments having different configurations are described below with reference to FIGS. 5A-5F.

Referring now to FIGS. 5A-5F, various storage compartments are shown. With specific reference to FIGS. 5A and 5D, storage compartment 30, as also shown in FIG. 4, includes the slotted storage section 32 as well the laterally extending storage compartment 34. It is contemplated that the slotted storage section 32 can be used to house items such as keys, wallets or mobile devices, while the elongate laterally extending storage compartment 34 would be more suitable for storing an item, such as an umbrella or flashlight. The storage compartment 30 includes a planar surface 33 from which the storage compartments 32, 34 inwardly or laterally extend. The storage compartment 30 includes a perimeter 36 which has a number of coupling mechanisms 38 disposed thereon. In assembly, the coupling mechanisms 38 are adapted to couple the storage compartment 30 to a housing, such as housing 12 shown in FIG. 4 and FIG. 5D, at a rim portion 19 disposed about a perimeter of aperture 18 of the housing 12. In this way, the storage compartment 30 couples to the housing to substantially fill the opening of aperture 18 disposed in the housing 12.

As shown in FIG. 5B, a panel end cap storage compartment 30A is shown having a similar configuration to storage compartment 30 shown in FIG. 5A. The storage compartment 30A includes a laterally extending compartment 34A as well as a lower storage compartment 32A. Coupling mechanisms 38A are disposed around a perimeter 36A which are adapted to couple the storage compartment 30A to a housing in a similar manner as described above. Referring now to FIG. 5C, another embodiment of a storage compartment 30B is shown having a single storage compartment 32B with coupling mechanisms 38B disposed along a perimeter 36B of the storage compartment 30B. In the embodiment shown in FIG. 5C, the panel end cap storage compartment 30B includes a containment member or gate member 40 which is adapted to contain items stored within the storage compartment 32B. Storage compartment 30B provides for a more shallow storage configuration for use in a vehicle instrument panel that may have ducts or other componentry disposed adjacent to the vehicle end cap.

Figure 5D:
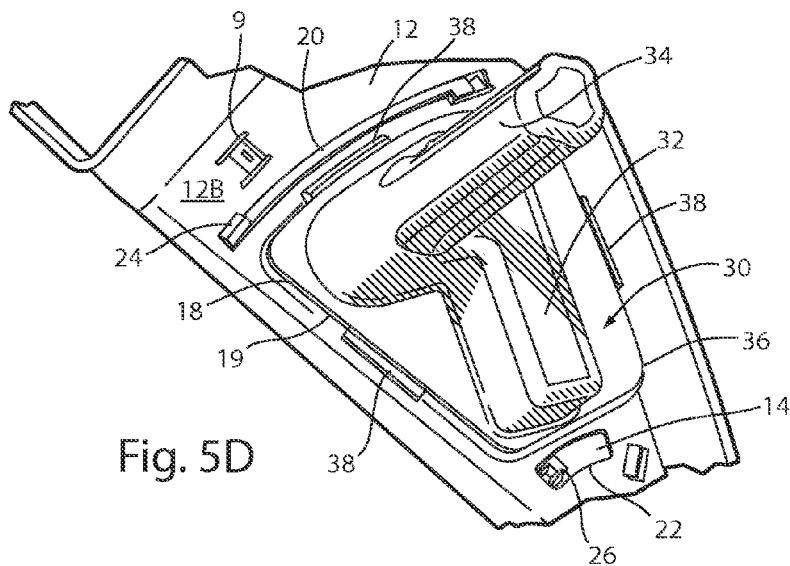
FIG. 5D is a rear perspective view of a right-hand panel end cap cover assembly according to another embodiment of the present invention.

Referring again to FIG. 5D, storage compartment 30, as shown in FIGS. 4 and 5A, is shown from an interior view, wherein the storage compartment 30 is coupled to the rim portion 19 of aperture 18 disposed on housing 12 via coupling mechanisms 38 disposed about the periphery 36 of the storage compartment 30. As shown in FIG. 5D, the housing 12 includes upper and lower through slots 20, 22 which are coupled to upper and lower guide members 24, 26 respectively. The guide members 24, 26 extend laterally from the interior side 14B of the cover member 14, which, in FIG. 5D, is visible only through upper and lower slots 20, 22. The position of the guide members 24, 26 as shown in FIG. 5D indicate that the cover member 14 is in the closed position A, as shown in FIG. 3. The coupling of the cover member 14 to the housing 12 and the opening and closing of the cover member 14 is further described below.

Figure 5E:
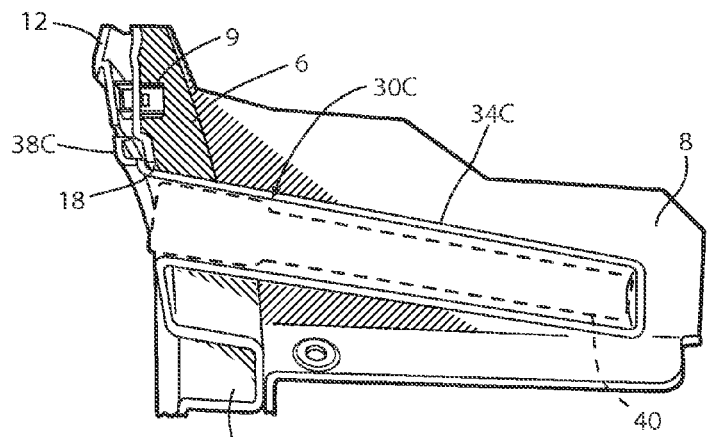
FIG. 5E is a cross sectional side elevational view of a right-hand panel end cap cover assembly according to another embodiment of the present invention.

Referring now to FIG. 5E, a panel end cap storage compartment 30C is shown having a laterally extending compartment 34C and a slotted compartment 32C. The storage compartment 30C is shown coupled to a housing 12 at aperture 18. The housing 12 is further coupled to a vehicle instrument panel 8 at an end cap 6 via a clip mechanism 9. Compartment 34C extends laterally along with vehicle instrument panel 8 shown in FIG. 5E and may include a downward cant for drainage purposes. As shown in FIG. 5E, the laterally extending storage compartment 34C has an elongate device 40 disposed therein which may be a device such as an umbrella or flashlight.

Figure 5F:
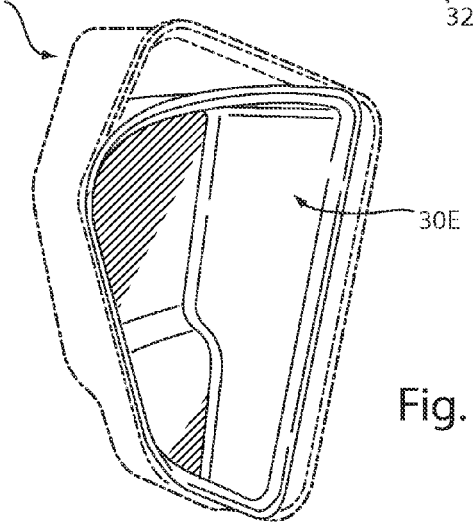
FIG. 5F is a perspective view of a panel end cap storage compartment for use with the present invention.

Referring now to FIG. 5F, a storage compartment 30D is shown having a storage compartment insert 30E disposed therein, such that the storage compartment 30D can accommodate inserts of varying configurations to accommodate the needs of a vehicle occupant. Further, the insert 30E can be removed from the storage compartment 30D should the vehicle occupant wish to take the insert 30E to a different location for any number of uses.

Figure 6:
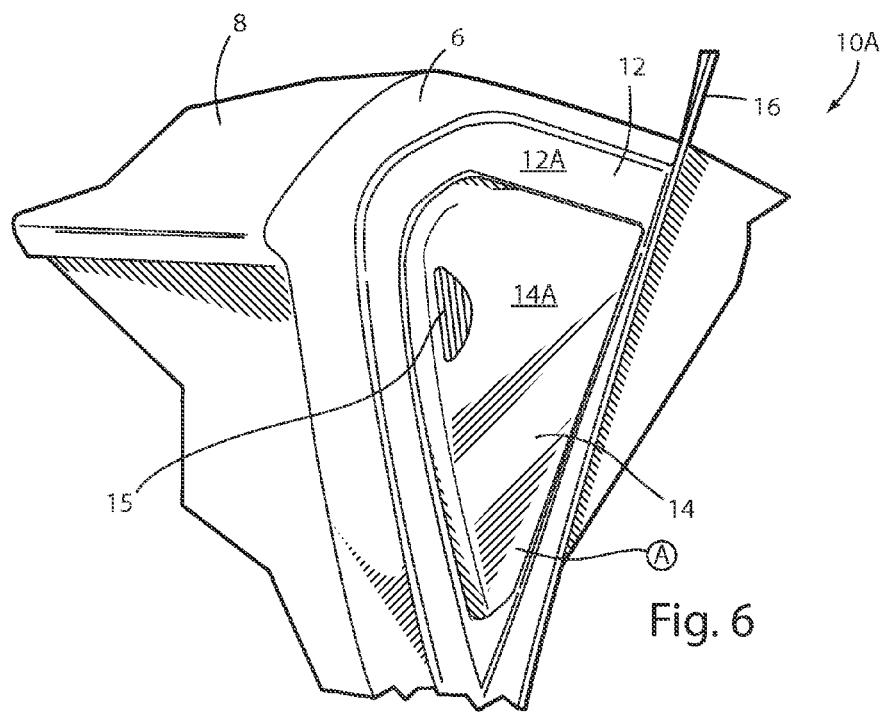
FIG. 6 is a fragmentary perspective view of the right-hand panel end cap assembly of FIG. 3 as disposed on an instrument panel.

Referring now to FIG. 6, a storage compartment end cap assembly 10A is shown having a housing member 12 coupled to a panel end cap 6 of an instrument panel 8. The cover member 14 is shown in the closed position A in FIG. 6.

Figure 7A:
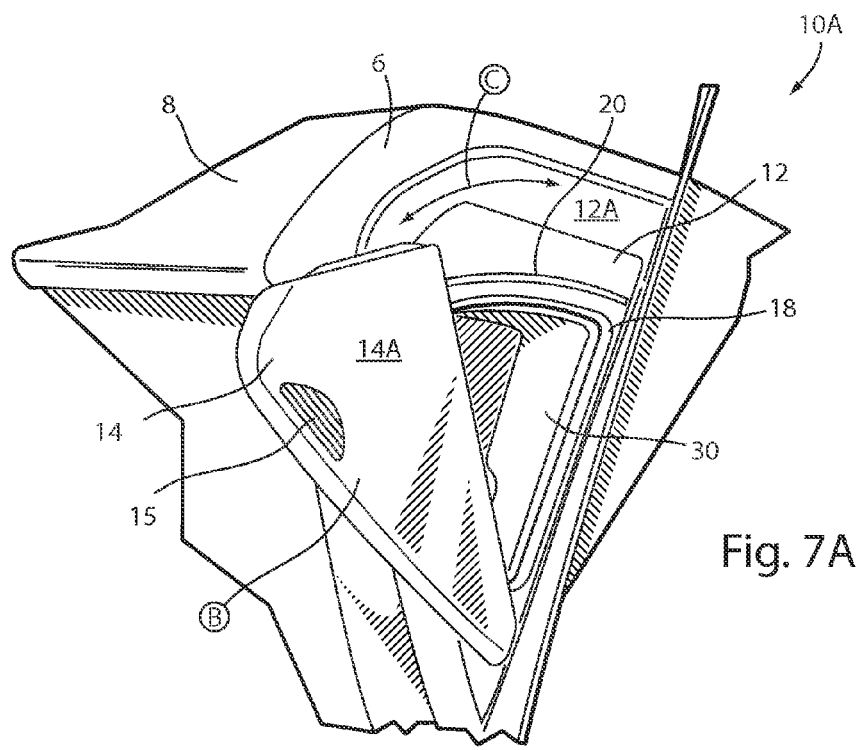
FIGS. 7A-7C are fragmentary perspective views of the panel end cap assembly of FIG. 6 having the cover member in an open position, thereby exposing various panel end cap storage configurations.
Figure 7B:
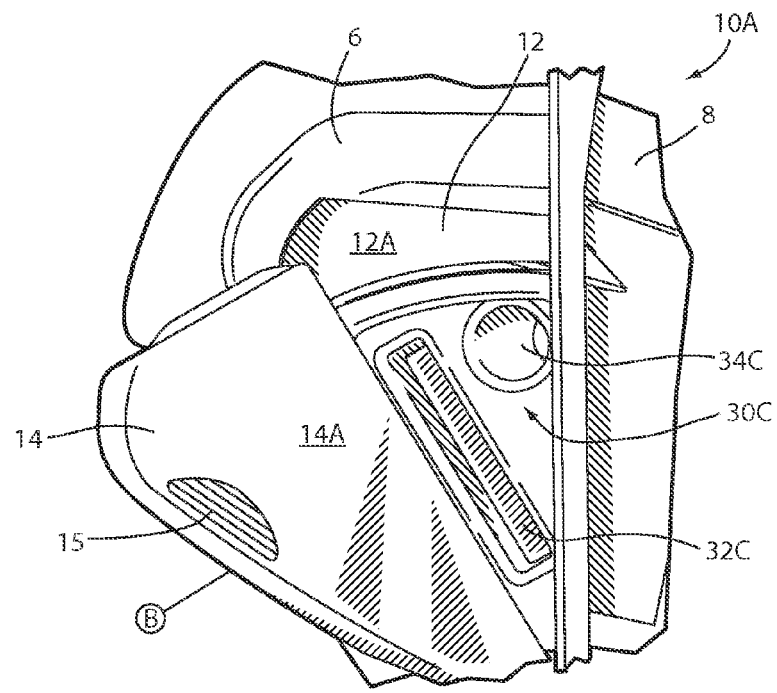
Figure 7C:
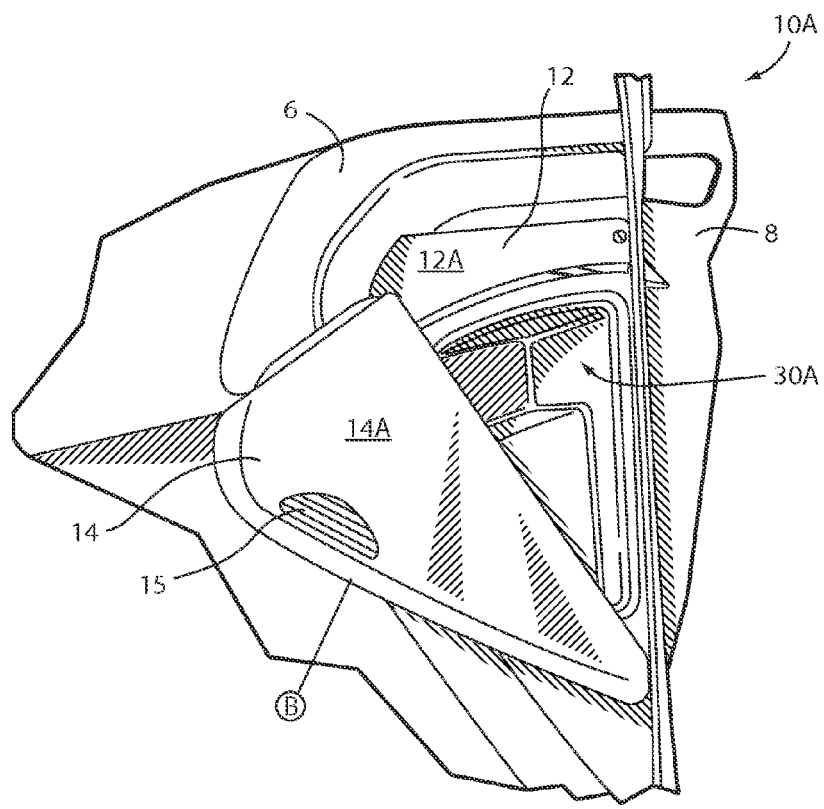

Referring now to FIGS. 7A-7C, the panel end cap assembly 10A, as shown in FIG. 6, is shown with the cover member 14 in the open position B as moved along a rotational axis as indicated by arrow C. The storage compartment 30 is coupled to the housing 12 at aperture 18, such that aperture 18 of the housing 12 opens laterally into the instrument panel 8. With reference to FIGS. 7B and 7C, the door member or cover member 14 is shown in the open position B such that storage areas 30C, as shown in FIG. 7B, and storage area 30A, as shown in FIG. 7C, are exposed for storing various items by a vehicle occupant. Thus, with reference to FIGS. 7A-7C, the present invention includes a multitude of panel end cap storage configurations which generally include at least one portion that extends laterally into an instrument panel.

Figure 8:
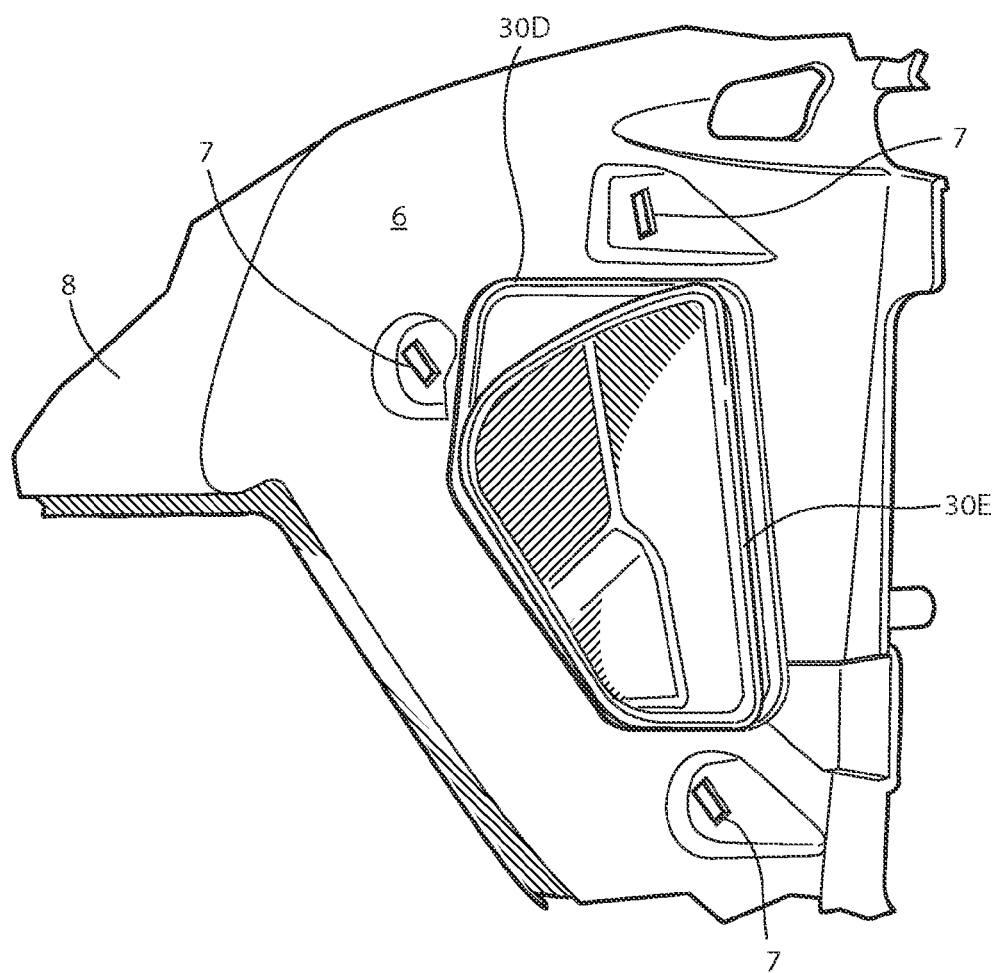
FIG. 8 is a side elevational view of a panel end cap having a panel end cap storage compartment.

Referring now to FIG. 8, an instrument panel 8 is shown having an end cap 6 with a storage compartment 30D disposed therein and an insert 30E disposed within the storage compartment 30D. The panel end cap 6 includes a plurality of clip receiving apertures 7 which are adapted to engage clip mechanisms disposed on a panel end cap housing and further described below. As shown in FIG. 8, storage bin 30D is designed to maximize the available space for the storage compartment, while still allowing for the attachment aperture 7 to be accessible to a panel end cap housing, such as panel end cap housing 12 shown in FIGS. 9A and 9B.

Figure 9A:
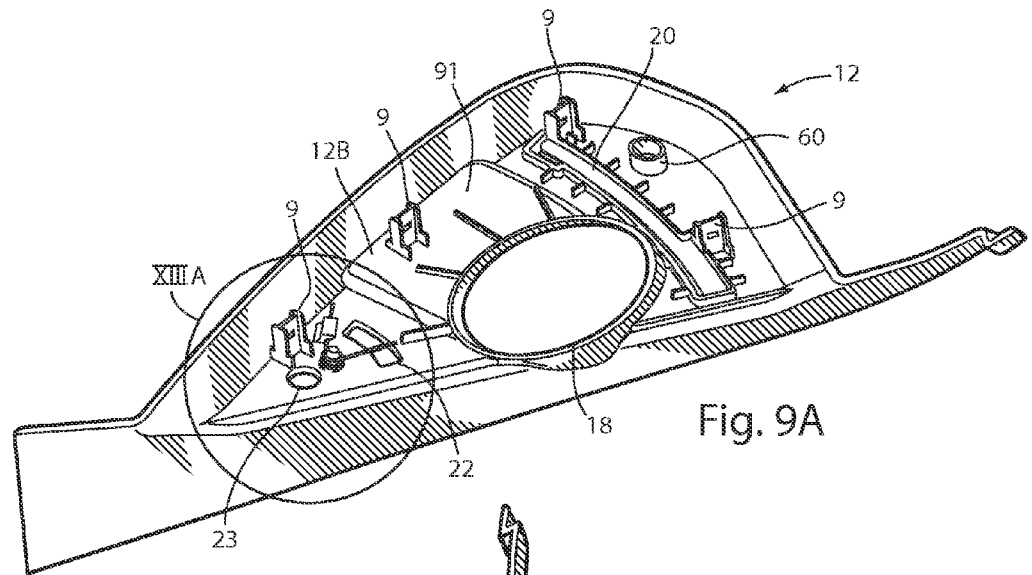
FIG. 9A is a rear perspective view of a left-hand housing member.
Figure 9B:
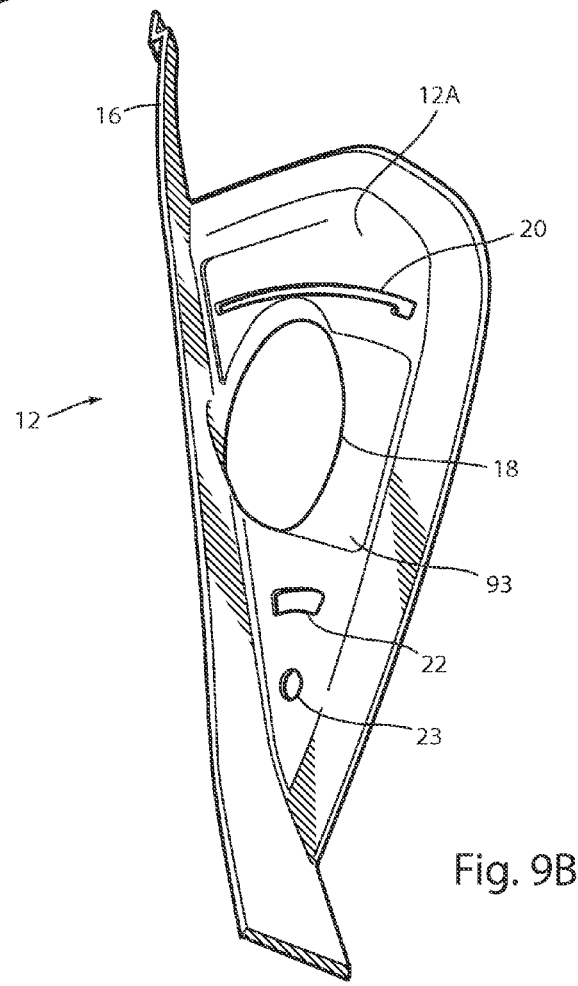
FIG. 9B is a front perspective view of the housing member of FIG. 9A.

Referring now to FIGS. 9A and 9B, a left-hand panel end cap housing 12 is shown having an upper slot 20 and a lower slot 22. As shown in FIG. 9A, the upper and lower slots 20, 22 are arcuately-shaped slots which correspond to the pivotal movement of the door member, such as door member 14 shown in FIG. 7A along an pivoting rotational axis indicated by arrow C. The housing 12 is shown in FIG. 9A from an interior or B-side 12B of the housing 12 and includes a plurality of clip mechanisms 9 which are adapted to align with and engage attachment apertures 7 of the panel end cap 6 as shown in FIG. 8. In this way, the housing 12 couples to the panel end cap 6 and assembly. A pivoting aperture 23 is disposed at a lower portion of the housing 12, and like slots 20, 22, the pivoting aperture 23 is a through aperture which is adapted to engage a door member as further described below. Storage aperture 18 is disposed on the housing 12 and is adapted to open into a laterally extending panel end cap storage compartment as further described below. A standoff member 60 is disposed at an upper end of the interior side 12B of the panel housing 12, and is adapted to abut the panel end cap 6, as shown in FIG. 8, in assembly. As shown in FIG. 9B, the exterior or A-side 12A of the housing 12 is shown with pivot aperture 23 and slots 20, 22 being disposed there through. Storage aperture 18 is also shown in FIG. 9B as being a through aperture which opens into a laterally extending panel end cap storage compartment.

Figure 10A:
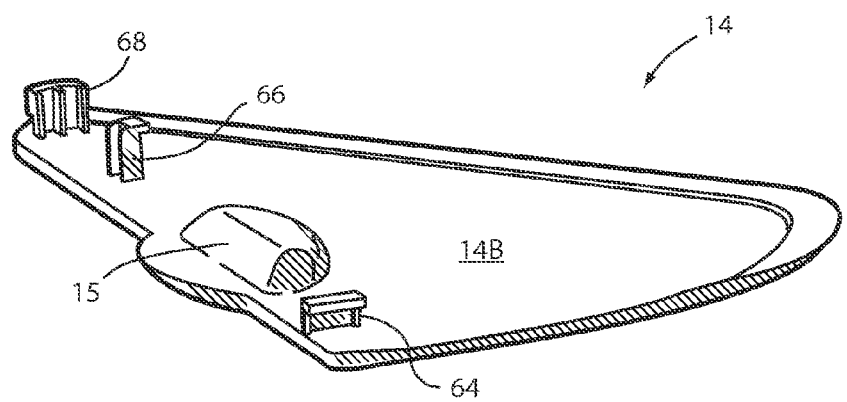
FIG. 10A is a rear perspective view of a cover member.
Figure 10B:
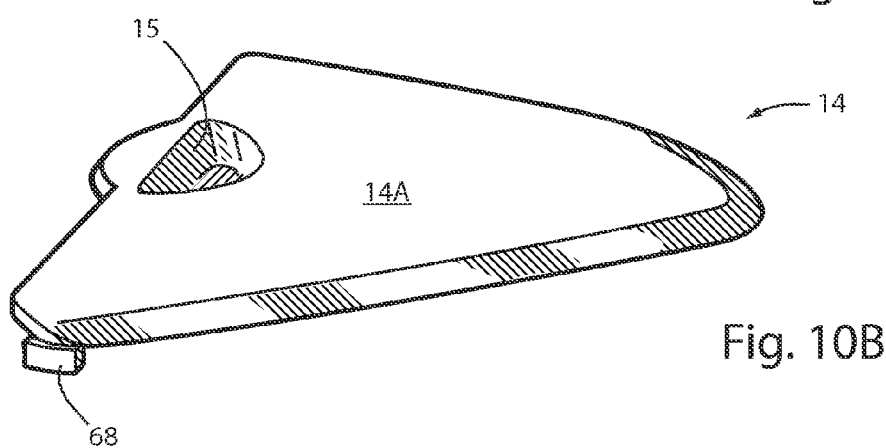
FIG. 10B is a top perspective view of the cover member of FIG. 10A.
Figure 10C:
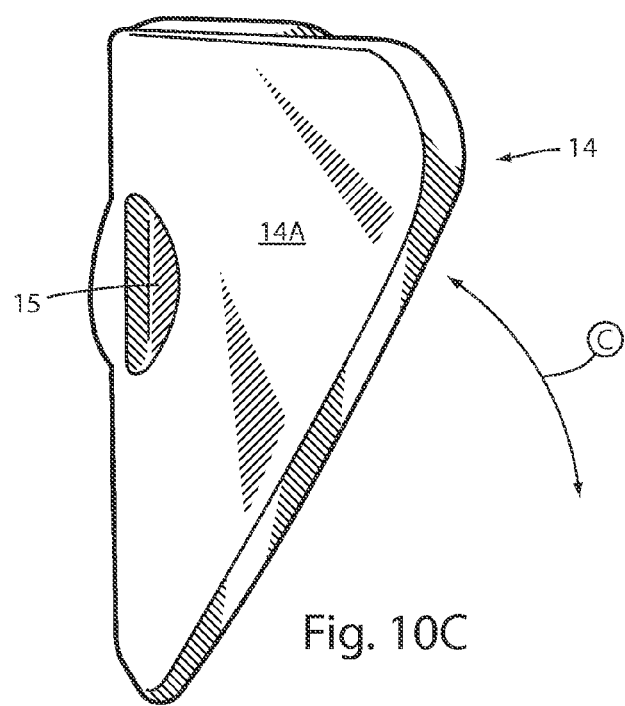
FIG. 10C is a front perspective view of the cover member of FIG. 10A.

Referring now to FIG. 10A-10C, a left-hand door member 14 is shown having an interior side 14B and an exterior side 14A. Extending outwardly from the interior side 14B, upper and lower guide members 64, 66 are shown which are adapted to couple to the upper and lower slots 20, 22 of the housing 12 shown in FIG. 9B. As further shown in FIG. 10A, a pivot clip 68 is disposed at a lowermost end of the door 14 and extends outwardly from the interior side 14B of the door 14. In assembly, the pivot clip 68 is adapted to couple to pivoting aperture 23 disposed on the housing 12 as shown in FIG. 9B. In the embodiments shown in FIGS. 10A-10C, the door member 14 includes a handle portion 15 which is a generally cup-shaped handle member extending inwardly into exterior surface 14A of the door member 14. It is contemplated that the handle member 15 can be positioned anywhere along the exterior surface 14A of the door member 14, so long as the handle member 14 is accessible to a user when an adjacent vehicle door is in an open position. As shown in FIG. 10C, the door member is adapted to pivot between open and closed positions along a pivoting rotational path as indicated by arrow C.

Figure 11A:
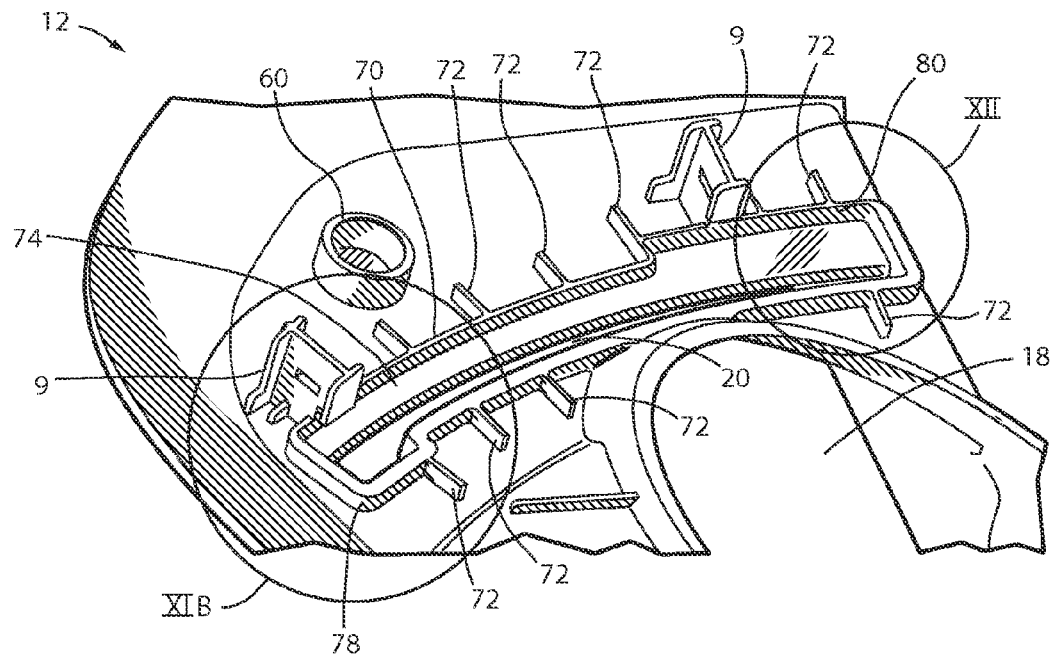
FIG. 11A is a fragmentary rear perspective view of the housing member of FIG. 9A.
Figure 11B:
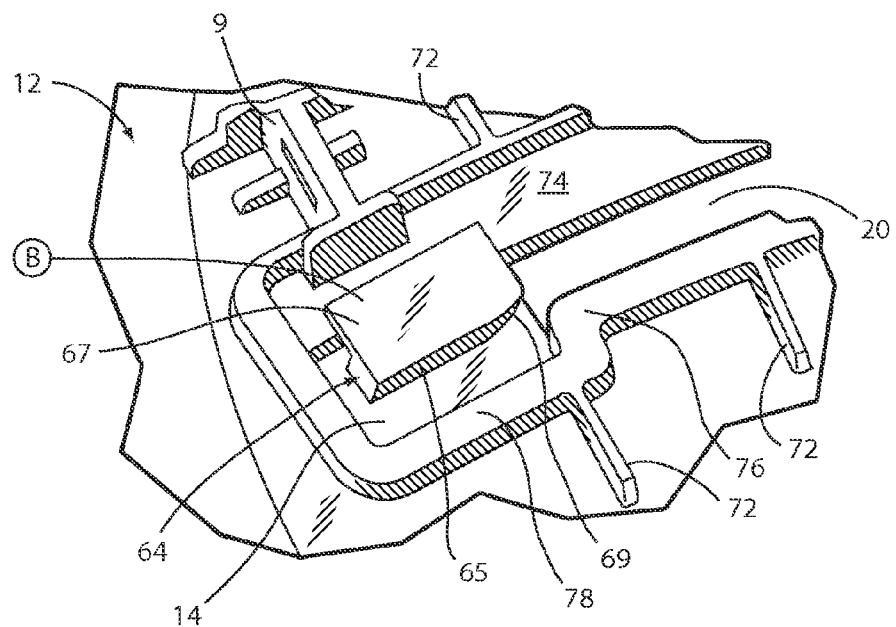
FIG. 11B is a fragmentary rear perspective view of the housing member of FIG. 11A taken at location XIB as coupled to a cover member.

Referring now to FIG. 11A, the top portion of the housing member 12 of FIG. 9A is shown. Upper slot 20 includes a perimeter wall 70 with a plurality of reinforcement ribs 72 extending therefrom. In assembly, a perimeter wall 70 is adapted to help retain upper guide member 64 of the door or cover member in an engaged position with slot 20. Along a length of slot 20 an upper planar portion 74 is disposed which helps to retain guide member 64 in an engaged position with slot 20 as it travels along slot 20 between open and closed positions. Slot 20 includes a lower offset portion 78 which houses guide member 64 of the door 14 when the door 14 is in the open position B as shown in FIG. 11B. An upper offset 80 is shown disposed on retaining wall 70 in a car-rearward direction relative to offset portion 78. When the door member 14 is in a closed position B, the guide member 64 will be disposed adjacent to the upper offset section 80 of the retaining wall 70 of slot 20 as further described below with reference to FIG. 12.

Referring now to FIG. 11B, guide member 64 includes a base portion 65 and an upwardly extending tab portion 67, which can be inserted through lower offset portion 78 of slot 20 to couple the door member 14 to the housing 12. The tab portion 67 is positively captured by planar portion 74 which is disposed above upper slot 20 in configuration. The guide member 64 further includes a chamfered leading edge 69 which is adapted to be a leading edge to radial portion 76 of perimeter wall 70 disposed below and adjacent to slot 20. In this way, guide member 64 is urged towards the proper position to move the base portion 65 along the length of slot 20 without getting caught up on radial portion 76. As shown in FIG. 11B, the upper guide member 64 is disposed within the housing 12 at lower offset portion 78, thereby indicating that the door 14 is in the open position B.

Figure 12:
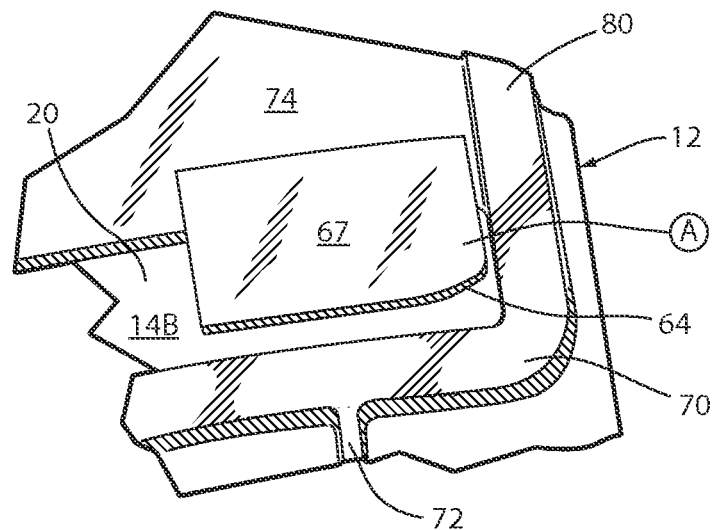
FIG. 12 is a fragmentary rear perspective view of the housing member of FIG. 11A taken at location XII as coupled to a cover member.

Referring now to FIG. 12, upper guide member 64 is shown disposed within slot 20 such that tab member 67 is engaged with the planar portion 74 to retain the guide member 64 within slot 20. As shown in FIG. 12, the guide member 64 has moved in a car-forward direction to offset portion 80 of slot 20, such that the door member 14 would be in the closed position A as shown in FIG. 1. As noted above, the components depicted inn FIGS. 1-2 and 9A-12 are parts from a left-hand panel end cap assembly 10.

Figure 13A:
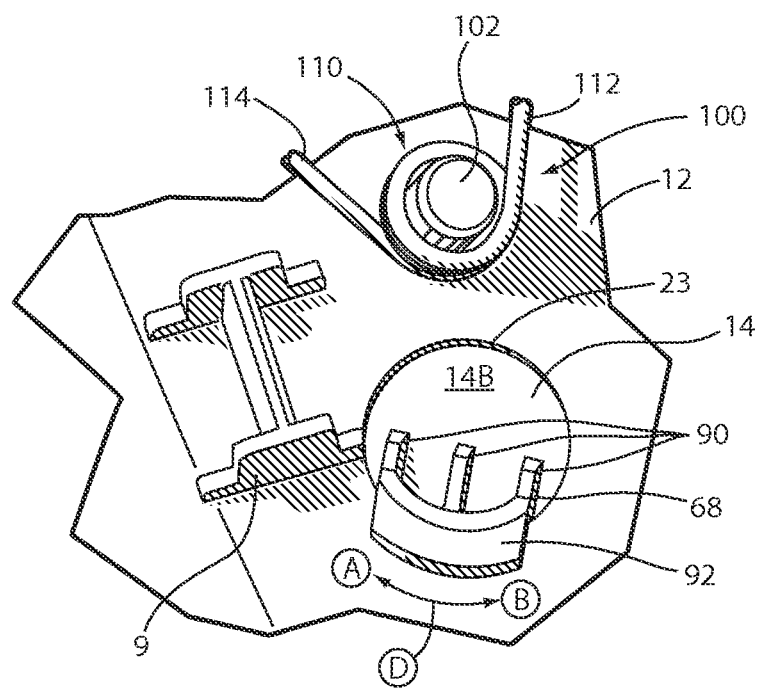
FIG. 13A is a rear fragmentary perspective view of the housing member of FIG. 9A taken at location XIIIA as coupled to a cover member.

Referring now to FIG. 13A, a left-hand door member 14 is shown coupled to left-hand housing 12 at pivot aperture 23 via pivot clip 68. In the embodiment shown in FIG. 13A, the pivot clip 16 includes a base portion 90 which extends upwardly from the interior side 14B of the door 14. In the embodiment shown in FIG. 13A, the base portion 90 includes a series of reinforcement ribs which couple to an upper tab portion 92 which overlap and couple with the interior side or B-side 12B of the housing 12 to retain the pivot clip 68 within pivoting aperture 23. Further, it is contemplated that a second pivoting clip 68 can be included to retain the door member 14 within pivot aperture 23, wherein the second pivoting clip would be disposed directly above or adjacent to pivoting clip 68 shown in FIG. 13A, such that when using a dual pivoting clip assembly, both pivoting clips would engage pivot aperture 23. Pivot clip 68 is adapted to rotate in a direction as indicated by arrow D between open and closed positions B and A as the door member 14 actuates along the actuation path C shown in FIG. 10C. As further shown in FIG. 13A, a biasing mechanism 100 is depicted, wherein an attachment peg 102 extends outwardly from the interior side 12B of the housing 12. In the embodiment shown in FIG. 13A, the biasing mechanism 100 includes a coil spring 100 having first and second arms 112, 114 and a coil portion 116 which is coiled around and coupled to attachment peg 102. In assembly, the biasing mechanism 100 is adapted to couple to a housing 12 and the door 14 to bias the door 14 towards the closed position A as further described below.

Figure 13B:
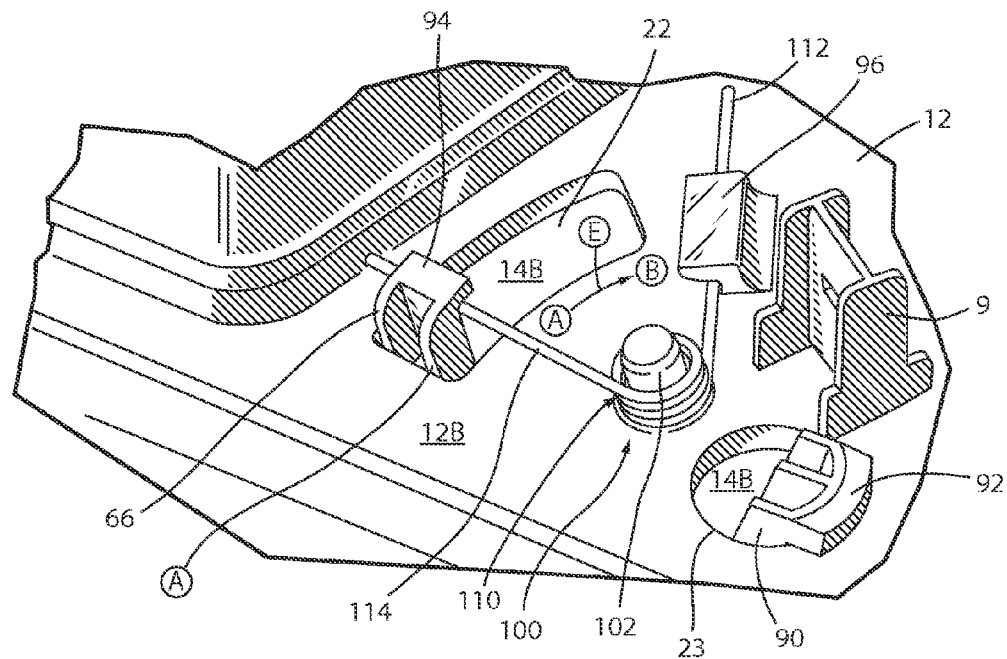
FIG. 13B is a rear fragmentary perspective view of a biasing mechanism coupled to a housing member and a cover member.
Figure 13C:
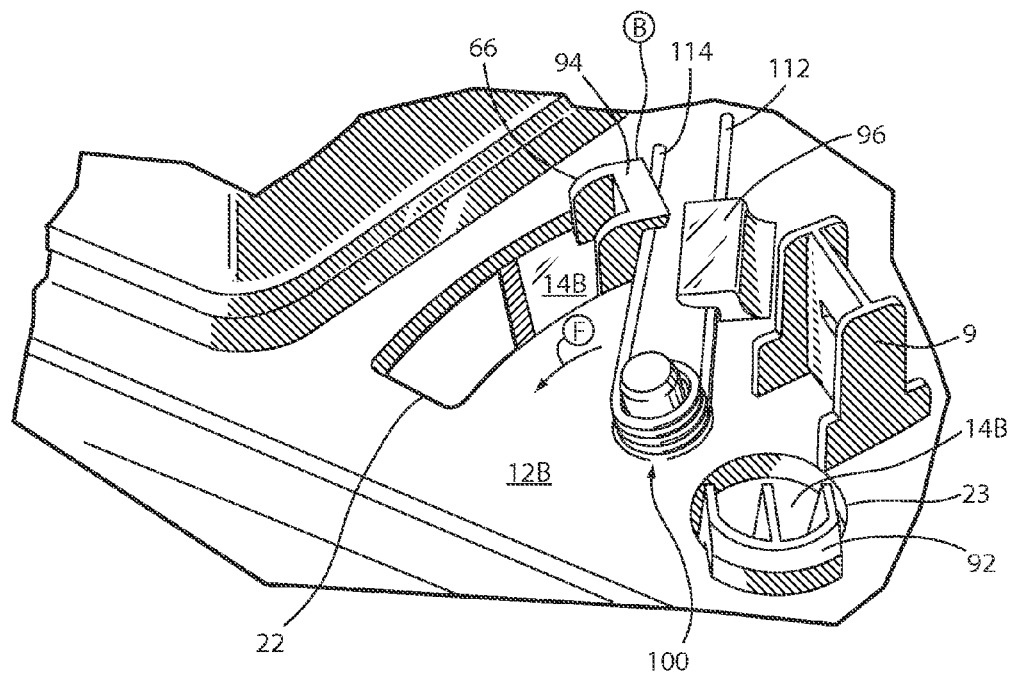
FIG. 13C is a fragmentary perspective view of the biasing mechanism of FIG. 13B with the biasing mechanism in a loaded position.

Referring now to FIGS. 13B and 13C, a biasing mechanism 100 is shown as coupled to a housing 12 and a door member 14 of a right-hand panel end cap assembly, such as assembly 10A shown in FIGS. 3 and 4. As shown in FIGS. 13B and 13C, car-rearward arm 112 is coupled to a clip mechanism 96 disposed on the interior side 12B of the housing 12. Clip 96 is a L-shaped clip which retains car-rearward arm 112 therein as shown in FIGS. 13B and 13C. Car-forward arm 114 is coupled to lower guide member 66 of door member 14. As shown, the lower guide member 66 includes a tab portion 94 to positively retain car-forward arm 114 of coil spring 110. The coil spring 110 is coupled to attachment peg 102 which extends outwardly from the interior side 12B of the housing 12. Thus, in the embodiment shown in FIG. 13B, the biasing mechanism 100 is coupled to the housing at attachment peg 102 and clip 96, and is further attached to the door member 14 at lower guide member 66. The door member 14 is in the closed position A in FIG. 13B, and in the open position B shown in FIG. 13C. Moving from FIG. 13B to FIG. 13C, door member 14 has moved from the closed position A to the open position B, such that guide member 66 has moved to the car-rearward end of slot 22, thereby compressing coil spring 110 by moving car-forward arm 114 towards car-rearward arm 112. In this way, the user has loaded the coil spring 110 by moving car-forward arm 114 in a direction as indicated by arrow E (FIG. 13B) from the closed position A to the open position B. A biasing force, indicated by arrow F in FIG. 13C, is now acting on the door member 14, such that when the user releases the door member 14, the biasing mechanism 100 will bias the door member 14 to the closed position A as shown in FIG. 13B.

Figure 14A:
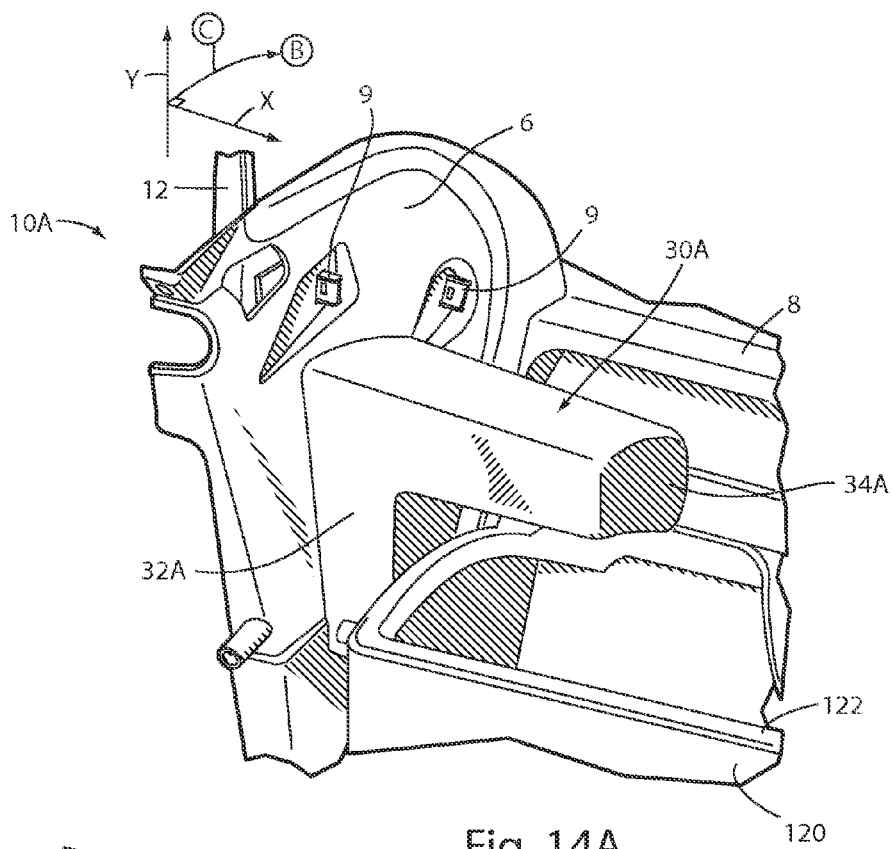
FIG. 14A is a rear perspective view of a right-hand panel end cap cover assembly according to another embodiment of the present invention as disposed in a vehicle instrument panel.
Figure 14B:
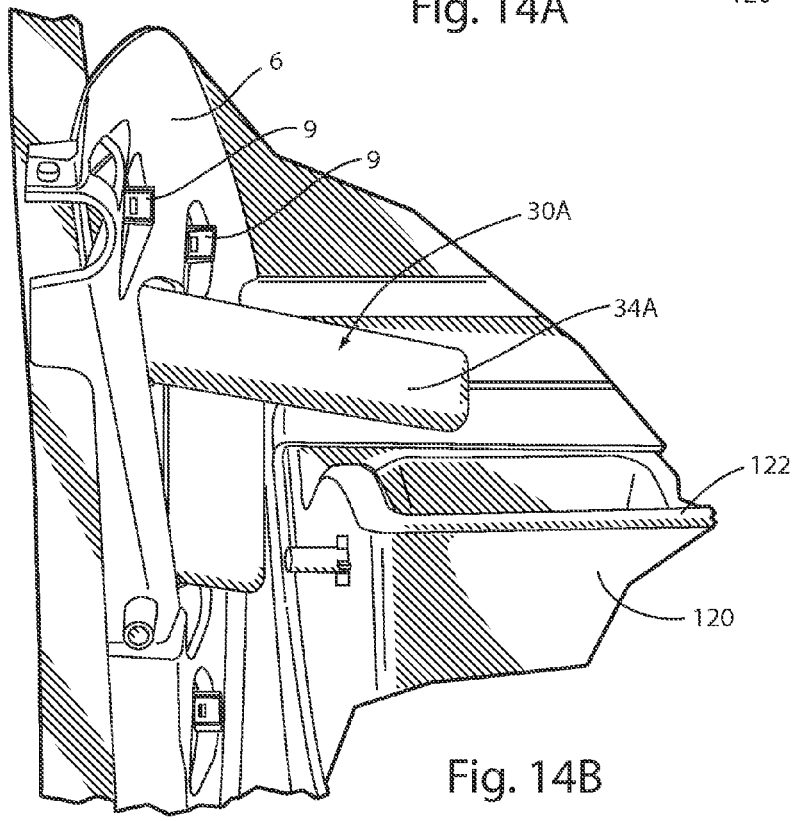
FIG. 14B is a side elevational view of the panel end cap assembly of FIG. 14A.

Referring now to FIGS. 14A and 14B, a right-hand panel end cap assembly 10A is shown having housing 12 coupled to end cap 6 via clip mechanisms 9. A storage compartment 30A, similar to storage compartment 30A shown in FIG. 7C, is shown having a laterally extending portion 34A and a lower compartment 30A. With reference to FIG. 14A, the laterally extending portion 34A of storage compartment 30A extends laterally within a plane into the instrument panel along a first access indicated by arrow X. The pivoting rotational path, indicated by arrow C, of the door or cover member 14 is shown in FIG. 14A as an arcuate path which defines a plane that is substantially perpendicular to axis X. Thus, the door or cover member 14 is adapted to pivot along the path indicated by arrow C between open and closed positions B and A, in a substantially vertical plane disposed along vertical axis Y as shown in FIG. 14A. In this way, the door or cover member 14 pivots vertically between car-forward and car-rearward directions, while the storage compartment 30A has a laterally extending portion 34A which extends perpendicularly into the instrument panel 8 relative to the door member 14. The articulation of the door member along actuation path C helps provide a low profile door member for the limited space available between a panel end cap, such as panel end cap 6, and an adjacent vehicle door, such as vehicle door 200 shown in FIG. 15.

In the embodiment shown in FIGS. 14A and 14B, a passenger side glove box 120 is shown which will generally open along an axis similar to that of the door member 14 of the present invention. As noted above, the instrument panel 8 is a congested area where spacing for storage compartments is limited. Thus, in the embodiments shown in FIGS. 14A and 14B, the storage compartment 30A is specifically configured with lower portion 32A and laterally extending portion 34A, such that the storage compartment 30A can be disposed above and adjacent to the upper portion 122 of the glove box 120. In this way, the storage compartment 30A does not interfere with the operation of the glove box 120 within the vehicle interior while still maximizing the storage capacity of the storage compartment 30A.

Figure 15:
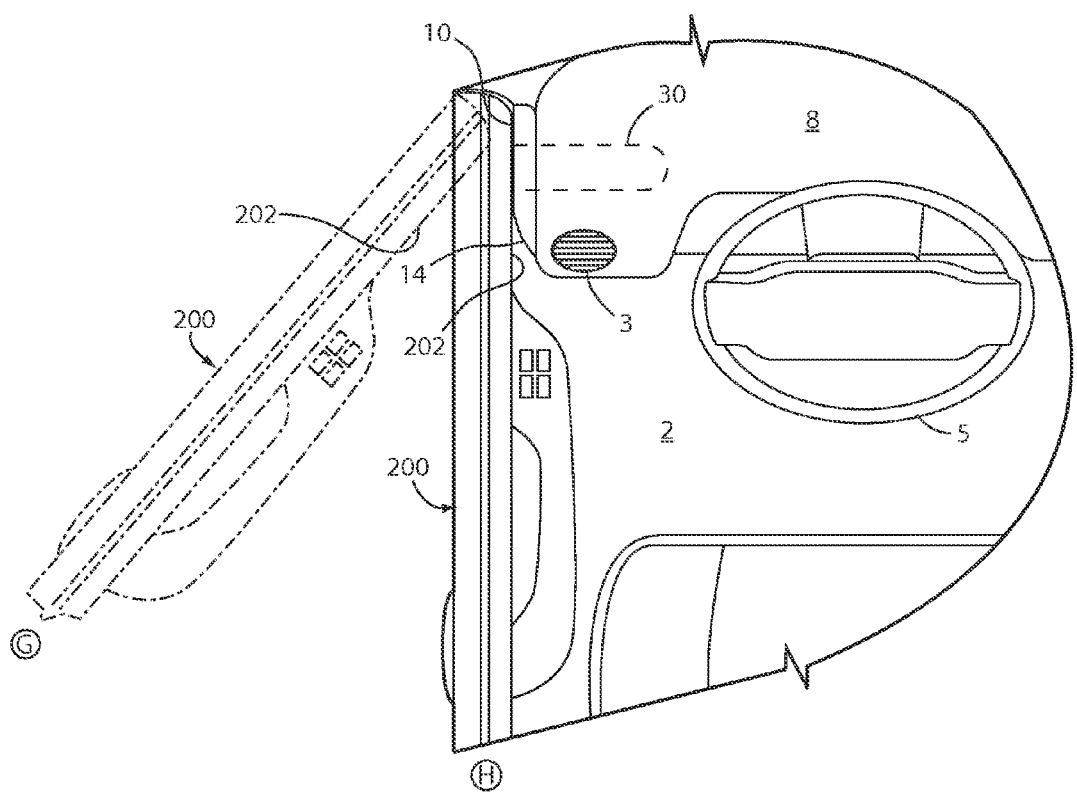
FIG. 15 is a top plan view of a left-hand panel end cap assembly as disposed in an vehicle interior and an adjacent vehicle door shown in open and closed positions.

Referring now to FIG. 15, the reference numeral 2 generally designates a vehicle interior on the driver's side. Vehicle interior 2 includes instrument panel 8 having an air vent 3 disposed thereon and a steering wheel 5 extending therefrom. The instrument panel 8 further comprises a left-hand instrument panel end cap assembly 10. Laterally extending storage compartment 30 is shown in phantom within the instrument panel 8. As shown in FIG. 15, the instrument panel end cap assembly 10 is disposed adjacent to a vehicle door 200 having an interior portion 202. As further shown in FIG. 15, vehicle door 200 is in a closed position H, such that the interior portion 202 of the vehicle door 200 abuts the panel end cap assembly 10, thereby making the panel end cap door 14 and storage compartment 20 inaccessible. Thus, the panel end cap door 14 and storage compartment 20 are only accessible when the vehicle door 200 is in an open position G, as shown in phantom in FIG. 15.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cover assembly for a panel end cap comprising:
a housing having an aperture, the aperture opening into a storage compartment laterally extending into an instrument panel;
a cover pivotally coupled to the housing for covering the aperture in a closed position and allowing access to the storage compartment in an open position;
a biasing mechanism coupled to the housing and the cover to bias the cover to the closed position;
upper and lower slots disposed on the housing;
upper and lower guide members disposed on the cover; and
wherein the upper and lower guide members of the cover are slideably received in the upper and lower slots of the housing respectively.

2. The cover assembly of claim 1, wherein:
the biasing mechanism includes a biasing spring having a first end and a second end, wherein the first end is coupled to the lower guide member of the cover and the second end is coupled to a retention clip disposed on the housing.

3. The cover assembly of claim 2, including:
a plurality of clip assemblies disposed on an interior side of the housing;
a plurality of clip receiving apertures disposed on the panel end cap adapted to receive the plurality of clip assemblies of the housing to operably couple the housing to the panel end cap.

4. The cover assembly of claim 3, including:
a pivot aperture disposed on the housing;
a pivot clip disposed on an interior side of the cover, wherein the pivot clip is adapted to pivotally engage the pivot aperture of the housing.

5. The cover assembly of claim 4, wherein:
the aperture on the housing includes an extending rim portion disposed about the aperture on the interior side of the housing; and
further wherein the storage compartment includes a plurality of clip assemblies adapted to couple the storage compartment to the housing along the rim portion of the aperture.

6. The cover assembly of claim 5, wherein:
the cover pivots relative to the housing between the open and closed positions along a rotational axis in a vertical plane, and further wherein the storage compartment laterally extends into the instrument panel in a direction contained in a plane substantially perpendicular to the vertical plane.

7. A cover assembly for a panel end cap comprising:
a housing having first and second slots and an aperture opening into a storage compartment laterally extending into an instrument panel;
a cover having guide members operably coupled to the first and second slots to slideably support the cover between open and closed positions; and
wherein the cover is accessible only when a vehicle door adjacent to the panel end cap is in an open position.

8. The cover assembly of claim 7, wherein:
the guide members include upper and lower guide members disposed on an interior side of the cover, and further wherein the cover includes a handle member disposed on an exterior side of the cover.

9. The cover assembly of claim 8, including:
a biasing mechanism coupled to the housing and the cover to bias the cover to the closed position.

10. The cover assembly of claim 9, wherein:
the biasing mechanism includes a biasing spring coupled to the lower guide member of the cover at a first end and further coupled to a retention clip disposed on the housing at a second end.

11. The cover assembly of claim 10, including:
a pivot aperture disposed on the housing; and
a pivot clip disposed on the interior side of the cover, wherein the pivot clip is adapted to pivotally engage the pivot aperture of the housing to support the cover along a pivoting rotational axis between the open and closed positions.

12. The cover assembly of claim 11, wherein:
the storage compartment laterally extends into the instrument panel in a direction contained in a plane substantially perpendicular to a vertical plane defined by the cover along the pivoting rotational axis of the cover.

13. A cover assembly for a panel end cap comprising:
a housing coupled to a panel end cap storage compartment;
a cover pivotally coupled to the housing between open and closed positions;
wherein the storage compartment extends laterally into an instrument panel along a first axis, and further wherein the cover pivots relative to the housing along a rotational axis to define a plane that is substantially perpendicular to the first axis;
upper and lower slots disposed on the housing;
upper and lower guide members disposed on the cover; and
wherein the upper and lower guide members of the cover are slideably received in the upper and lower slots of the housing respectively.

14. The cover assembly of claim 13, including:
an aperture disposed on the housing, the aperture on the housing having an extending rim portion disposed about the aperture on an interior side of the housing, wherein the storage compartment includes a plurality of clip assemblies adapted to couple the storage compartment to the housing along the rim portion of the aperture.

15. The cover assembly of claim 14, including:
a biasing mechanism coupled to the housing and the cover to bias the cover to the closed position.

16. The cover assembly of claim 15, wherein:
the biasing mechanism includes a biasing spring coupled to the lower guide member of the cover at a first end and further coupled to a retention clip disposed on the interior of the housing at a second end.

17. The cover assembly of claim 16, including:
a pivot aperture disposed on the housing; and
a pivot clip disposed on an interior side of the cover, wherein the pivot clip is adapted to pivotally engage the pivot aperture of the housing to support the cover along the rotational axis between the open and closed positions.

18. The cover assembly of claim 17, including:
a stand-off member disposed on an upper portion of the interior side of the housing, wherein the stand-off member is adapted to abut the panel end cap in assembly.

* * * * *